(12) United States Patent
Morgan et al.

(10) Patent No.: US 10,099,081 B2
(45) Date of Patent: Oct. 16, 2018

(54) DEVICE FOR SAFE STORAGE AND DISPOSAL OF EMBALMING PROCEDURE WASTE

(71) Applicant: JGM Enterprises, LLC, Corbin, KY (US)

(72) Inventors: James G. Morgan, Corbin, KY (US); Eric Wooldridge, Stanford, KY (US)

(73) Assignee: JGM ENTERPRISES, LLC, Corbin, KY (US)

( * ) Notice: Subject to any disclaimer, the term of this patent is extended or adjusted under 35 U.S.C. 154(b) by 543 days.

(21) Appl. No.: 14/733,020

(22) Filed: Jun. 8, 2015

(65) Prior Publication Data

US 2015/0352388 A1    Dec. 10, 2015

Related U.S. Application Data

(60) Provisional application No. 62/009,419, filed on Jun. 9, 2014.

(51) Int. Cl.
| | |
|---|---|
| *A62D 3/33* | (2007.01) |
| *A62D 3/40* | (2007.01) |
| *B09B 3/00* | (2006.01) |
| *A62D 101/20* | (2007.01) |

(52) U.S. Cl.
CPC .............. *A62D 3/33* (2013.01); *A62D 3/40* (2013.01); *B09B 3/0075* (2013.01); *A62D 2101/20* (2013.01)

(58) Field of Classification Search
CPC ........ A61D 3/33; A61D 3/40; A61D 2101/20; B09B 3/0075; A01N 1/00–1/0294
See application file for complete search history.

(56) References Cited

U.S. PATENT DOCUMENTS

| | | | | |
|---|---|---|---|---|
| 2001/0053869 | A1* | 12/2001 | Kaye | ........................ A61L 11/00 588/303 |
| 2004/0141877 | A1* | 7/2004 | Devine | .................... A61L 11/00 422/32 |
| 2014/0209718 | A1* | 7/2014 | Bevins | .................... B02C 23/10 241/24.11 |

* cited by examiner

*Primary Examiner* — Benjamin Klein
(74) *Attorney, Agent, or Firm* — King & Schickli, PLLC

(57) ABSTRACT

A device for storage and disposal of embalming procedure waste from an embalming procedure of an animal or human corpse. The device includes an inlet for receiving the embalming procedure waste and an encapsulate storage unit configured for holding absorbent encapsulate. The device further includes a mixing unit fluidly connected to the inlet and the encapsulate storage unit, a diverter device connected to the mixing unit and at least one storage unit configured to receive and store the embalming procedure waste from the diverter device.

14 Claims, 2 Drawing Sheets

DEVICE FOR SAFE STORAGE AND DISPOSAL OF EMBALMING PROCEDURE WASTE

This application claims the benefit of U.S. Provisional Patent Application Ser. No. 62/009,419, filed on Jun. 9, 2014, the disclosure of which is incorporated herein by reference.

TECHNICAL FIELD

This disclosure relates generally to embalming waste storage and disposal devices and, more particularly, to a device and related method for safe storage and disposal of embalming procedure waste resulting from the modern embalming process to promote a cleaner and healthier environment.

BACKGROUND

Embalming is the art and science of temporarily preserving the body of a deceased person by treating them with chemicals to delay decomposition. Generally, one of the primary goals of modern embalming is to delay decomposition to allow for suitable presentation of the deceased at public display, such as funerals and other religious practices or for shipment of the remains to a distant place for disposition. Generally, the embalming process may involve up to four distinct parts: (i) arterial embalming; (ii) cavity embalming; (iii) hypodermic embalming; and (iv) surface embalming.

In more detail, arterial embalming involves the injection of embalming chemicals into the blood vessels, usually via the right common carotid artery. Blood and interstitial fluids are displaced by this injection and are expelled from the right jugular vein and often referred to as drainage. The embalming solution is injected with a centrifugal pump. Turning to cavity embalming, it refers to the replacement of internal fluids inside body cavities with embalming chemicals (such as formaldehyde) via the use of an aspirator and trocar. Hypodermic embalming is a supplemental method relating to the injection of embalming chemicals into the tissues with a hypodermic needle and syringe, which is sometimes used to treat area where arterial fluid has not been successfully distributed during the main arterial injection. Finally, surface embalming is another supplemental method wherein embalming chemicals are used to preserve and restore areas directly on the deceased skin's surface and other superficial areas.

Embalming chemicals are a variety of preservatives, sanitizers, disinfectant agents and additives to delay decomposition and restore a natural appearance for viewing a body after death. A mixture of these chemicals is known as the embalming fluid, which may consist of formaldehyde, ethanol, phenol, methanol, wetting agents and other solvents. Formaldehyde and ethanol are typically the chemicals that are present in the embalming fluid in the greatest quantities. As embalming operations involve discharging blood, bodily fluids, biological wastes containing harmful bacteria and microorganisms and various preservation chemicals, they present a problem for the proper treatment of sanitary wastewater.

Typically, funeral homes dispose of embalming fluids and hazardous biomedical wastes, such as blood, bodily fluids and the like into the municipal sanitary sewer system or an on-site sewage treatment and disposal system, using the common floor drains in the preparation room, such as a drain connected to an embalming table. As a result, this type of disposal method of embalming fluids and hazardous biomedical wastes from an embalming procedure poses a potentially severe and direct risk of hazardous contamination of ground water and soil, which can ultimately affect human health and the environment. While the wastewater is treated prior to being sent out for reuse, which is designed to completely sanitize the water of diseases and pathogens, it is not always effective. Indeed, embalming chemicals and water treatment does not completely purify this water of all organisms that can cause infectious and potentially fatal diseases. Pathogens and chemicals present in the hazardous waste can leech out and contaminate ground water and surface water, especially during boil water advisories due to line breaks.

Specifically, prions are pathogens that are not killed by the common methods of disinfection and sterilization. Prions cause the destruction of neural cells, which leaves tiny holes in the brain tissue. These pathogens cause a family of diseases known as the Transmissible Spongiform Encephalopathies (TSEs), including "Mad Cow Disease," classic Creutzfeldt-Jakob disease (CJD) and variant CJD (vCJD). CJD and vCJD are degenerative, invariably fatal brain disorders. TSEs have no cure, vaccine or effective treatment. The National Center for Infectious Diseases consider it an "emerging infectious disease."

The current waste treatment process contributes to the increase of antibiotic-resistance bacteria because not all of the bacterial genes that can cause antibiotic resistance are killed. They are then released to lakes and rivers and can wind up into the drinking water supply. The genetically mutated bacteria cannot be killed by antibiotic drug treatments, which allows for diseases that were once controlled by antibiotics to re-emerge as serious threats to the health of the public.

Accordingly, there is a need for a system for reducing the risk of disease from contaminated waters caused by the current method of hazardous waste disposal for the typical embalming process. Specifically, the system should reduce the risks and occurrences associated with antibiotic-resistant infections and chronic wasting diseases by destroying prions and preventing antibiotic-resistant bacteria from flourishing by storing the hazardous materials in a low temperature environment, which inhibits bacterial multiplication. Furthermore, the system should use an encapsulate to absorb hazardous wastes to reduce the risk of spill contaminations during disposal of the hazardous waste from the embalming process.

SUMMARY

In accordance with one aspect of the disclosure, a device for storage and disposal of embalming procedure waste from an embalming procedure of an animal or human corpse is provided. The device includes an inlet for receiving the embalming procedure waste and an encapsulate storage unit configured for holding absorbent encapsulate. The device further includes a mixing unit fluidly connected to the inlet and the encapsulate storage unit, a diverter device connected to the mixing unit and at least one storage unit configured to receive and store the embalming procedure waste from the diverter device.

In one embodiment, the device includes an outlet such as a slidable access door or a drawer and the inlet may be a tube configured for transferring the embalming procedure waste from the animal or human corpse to the mixing unit. The device may be mobile. The at least one storage unit may include a first storage unit and a second storage unit, which are both removable from the device. The mixing unit may be tapered towards the diverter device. The encapsulate storage unit may be a hopper for dispensing the absorbent encapsulate into the mixing unit.

In accordance with another aspect of the disclosure, a system for storage and disposal of embalming procedure waste from an embalming procedure of an animal or human corpse is disclosed. The system includes a container having an inlet for receiving the embalming procedure waste and an outlet and an encapsulate storage unit for holding an absorbent encapsulate. The system further includes a mixer positioned within the container and configured to receive the embalming procedure waste from the inlet and the absorbent encapsulate from the encapsulate storage unit. The system also includes a diverter positioned within the container and below the mixer for receiving a mixed composition of the embalming procedure waste and the absorbent encapsulate and at least two removable waste storage units for receiving a predetermined weight of the mixed composition from the diverter.

In another embodiment, the mixer may be mechanically driven or manually driven. The diverter may include a sensor associated with a valve. The diverter transfers the mixed composition to a first of the at least two removable storage units until the sensor detects the predetermined weight and automatically shifts the valve such that the diverter transfers a remaining portion of the mixed composition to a second of the at least two removable storage units.

In yet another aspect of this disclosure a method of storage and disposal of embalming procedure waste from an embalming procedure of an animal or human corpse is disclosed. The method includes: (1) providing a container housing one or more storage units for storing the embalming procedure waste; (2) transferring the embalming procedure waste from the animal or human corpse into the container; (3) adding an absorbent encapsulate to the embalming procedure waste; (4) mixing the absorbent encapsulate and the embalming procedure waste; and (5) facilitating a mixed composition of the absorbent encapsulate and the embalming procedure waste into the one or more storage units.

In yet another embodiment, the method includes removing the one or more storage units containing a mixed composition of the absorbent encapsulate and the embalming procedure waste from the container and placing the one or more storage units into cold storage. The method may also include the step of providing a diverter for transferring a portion of the mixed composition into a first storage unit until a predetermined weight is reached and transferring a remaining portion of the mixed composition into a second storage unit once the predetermined weight is reached.

BRIEF DESCRIPTION OF THE DRAWINGS

The accompanying drawings incorporated in and forming a part of the specification, illustrate several aspects of this disclosure, and together with the description serve to explain the principles of the disclosure. In the drawings.

DETAILED DESCRIPTION

In the following detailed description, reference is made to the accompanying drawings that form a part hereof, and in which is shown by way of illustration, specific embodiments in which the invention may be practiced. These embodiments are described in sufficient detail to enable those skilled in the art to practice the embodiments and like numerals represent like details in the various figures. Also, it is to be understood that other embodiments may be utilized and that process or other changes may be made without departing from the scope of the disclosure. The following detailed description is not to be taken in a limiting sense, and the scope of the disclosure is defined only by the appended claims and their equivalents. In accordance with the disclosure, a device and related method for the storage and disposal of embalming procedure waste resulting from the modern embalming process of a human or animal corpse is hereinafter described.

Figure 1:
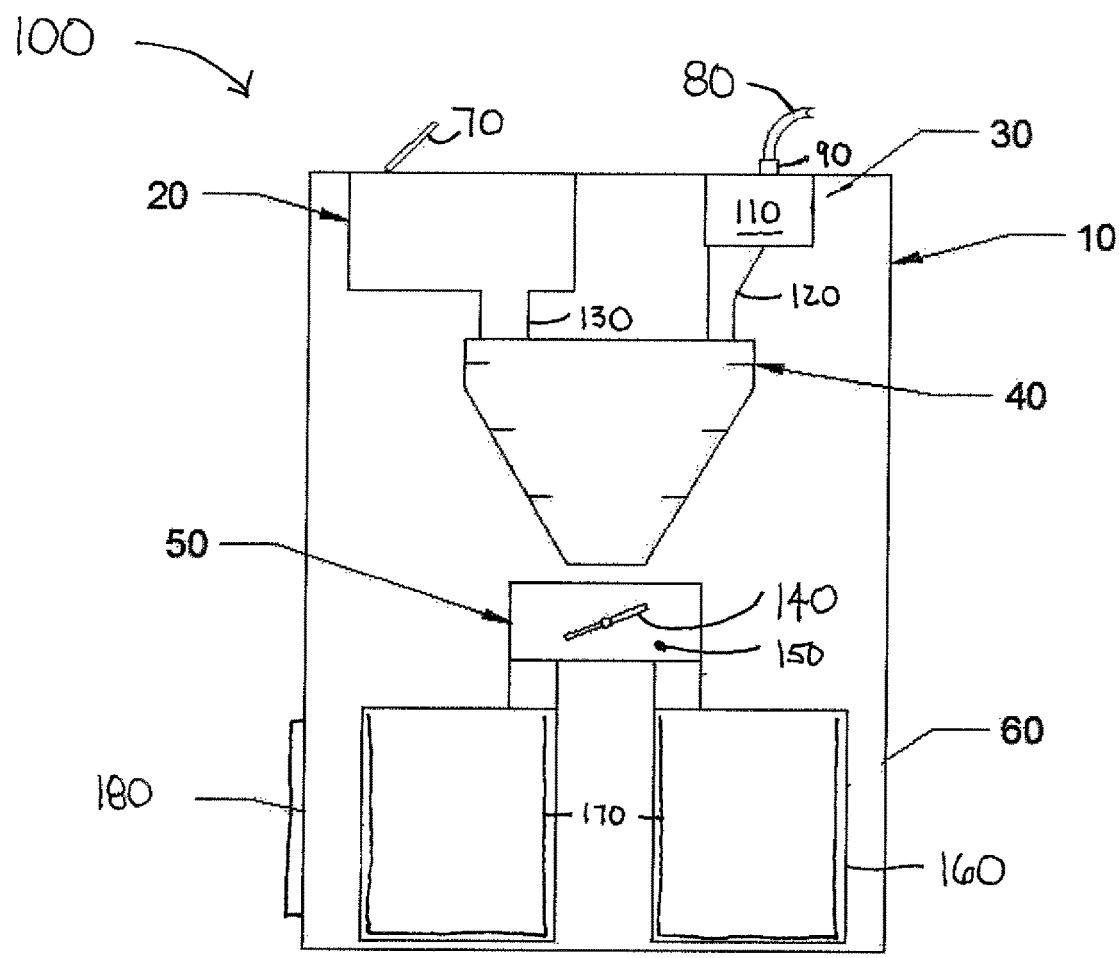
FIG. 1 is a front view of a system for storage and disposal of embalming procedure waste resulting from the modern embalming process forming one aspect of this disclosure.

Reference is now made to FIG. 1, which illustrate a device or system 100 for the storage and disposal of embalming procedure waste resulting from the modern embalming process of a human or animal corpse. The system or device 100 may be in the form of a reusable container 10 or housing having a hollow body for housing or constraining other elements of the disclosure discussed below. For example, the container 10 may resemble a cabinet with doors and/or sliding shelves or panels and may be lockable. The container 10 or housing is typically made of a rigid material to promote durability, such as stainless steel or a similar material. The rigid material also allows the container to be easily cleaned and sterilized after each use.

The container 10 is typically positioned adjacent or near the embalming table (not shown) and the embalming fluid pump (not shown) may be placed on the container. The container may have wheels located on its base for increased mobility around the embalming room during the embalming procedure. Although the container 10 shown in FIG. 1 is substantially rectangular-shaped, it should be appreciated that it may come in other sizes and shapes.

The container 10 may have one or more openings or access points for receiving and removing of materials and elements discussed herein. These openings or access points may be in the form of access panels, slidable drawers, lids, doors or other openings. At a top end of the container, an inlet unit 30 is positioned is typically positioned within the container 10. In one embodiment, the inlet unit 30 may include at least one tube 80 or other conduit attached to a multi-speed vacuum for "sucking" the blood, embalming fluid and other materials from the corpse. The inlet unit 30 may be configured to connect to the human or animal corpse as well as the container 10. The tube may be made from a flexible material, such as vinyl or rubber, but it should be appreciated that other types of more rigid conduits may be used. At the opposite end typically positioned on the exterior of the container 10, a nozzle 90 or the like ejects waste from the corpse into a second part 110 of the inlet tube (typically positioned within the container 10). The second part 110 of the inlet unit 30 may include a device 120 for ejecting waste into the mixing unit or chamber 40.

The primary function of the inlet unit 30 is to facilitate entry of biomedical waste from the human or animal corpse into the container 10 in a controlled fashion via a multi-speed vacuum or pumping device (not shown) and then on to the mixing unit 40. The rate of speed of the biomedical waste into the container may be controlled by a valve associated with the nozzle 90 or the vacuum. Of course, it should be appreciated that the inlet unit 30 can be a variety of shapes and material composition and components that facilitate the entry of the biomedical waste from the corpse into the container and ultimately to the mixing unit 40.

With further reference to FIG. 1, an encapsulate storage unit 20 is positioned within or attached to the container 10. The encapsulate storage unit 20 may be in the form of a hopper having an opening or access point at a top end 70 for receiving a standard absorbent encapsulate. The encapsulate storage unit 20 also has another opening or access point 130 at an opposite end for ejecting the encapsulate into the mixing unit 40. The absorbent encapsulate is typically an organic or inorganic-based compound, which is designed to added into the mixing unit 40 to mix with the hazardous medical wastes from the embalming process and efficiently absorb and encapsulate all of the waste.

Although the encapsulate storage unit 20 is typically positioned within the container, it is removable from the container. For example, the encapsulate storage unit 20 may be removed from the container and filled with the absorbing encapsulate via an opening, such as a sealable lid. Alternatively, as discussed above, the encapsulate storage device may remain within the container 10 and filled with the absorbing encapsulate via the opening 70. The encapsulate storage unit 20 is typically a rigid structure and may be of various sizes or shapes.

The mixing unit or chamber 40 is typically positioned within the container 10 and below both the encapsulate storage unit 20 and the inlet unit 30. The mixing unit 40 may have two openings at a top end, a first opening for receiving the encapsulate from the encapsulate storage unit and a second opening for receiving the biomedical waste from the inlet unit. Alternatively, both the encapsulate from the encapsulate storage unit and the biomedical waste from the inlet unit may enter the mixing unit 40 via a single opening. The mixing unit is configured to ensure that the encapsulate efficiently absorbs all of the biomedical waste and then allow the resulting mixed composition to pass to a diverter device 50 via an opening at the bottom end of the mixing unit.

The mixing unit may be a variety of sizes and shapes and should typically be made of non-corroding material(s), such as stainless steel. In one embodiment, the mixing unit has a tapered configuration such that the top end of the mixing unit 40 is rectangular-shaped and is tapered towards the opening in the bottom end. The larger top end serves to mix the absorbent encapsulate and waste material by various methods of mixing, including mechanically powered and/or passively/manually. The mixing unit may include an auger for mixing the absorbent encapsulate and the waste material. Once the materials are sufficiently mixed, the mixed composition is ejected via the bottom opening to allow passage to the diverter device 50.

The diverter device 50 is contained within the container or housing 10 and positioned below the mixing unit to receive the mixed composition from the mixing unit 40. The primary function of the diverter device 50 is to control the quantity of the mixed composition traveling from the mixing unit 40 to one or more removable waste storage unit(s) 60. As discussed below, the diverter device 50 is configured to change the direction of the mixed composition from the mixing unit to one of the removable storage units when capacity is reached so that the mixed composition will be diverted to another removable waste storage unit.

Specifically, the diverter device 50 may have a valve 140 connected to a sensor 150 or the like. The sensor 150 may be incorporated into the diverter device for detecting the amount of mixed material transferred from the diverter device 50 into one of the removable waste storage units 60. Alternatively, the sensor may take the form of a weight sensor located in each of the removable waste storage units that detects a predetermined weight or amount of mixed material being transferred to a first removable waste storage unit. Once the predetermined weight is reached, the sensor sends a signal to the valve to close entry to the first removable waste storage unit, and automatically opens the pathway to transfer the remaining mixed material to the second removable waste storage unit 60. In another embodiment, the valve may be configured to automatically close entry to the first removable storage unit when the first removable storage unit is full and open entry to the second removable storage unit without the need for a sensor or the like.

The primary purpose of the diverter device 50 is to control the amount of material and, therefore, the total weight that either of the removable waste storage units represents such that the removable waste storage units do not exceed a particular weight, so that they can be easily managed and transported. It should be appreciated that the diverter device 50 can be a variety of shapes and sizes and may include sensors and other similar components to distribute the mixed material from the mixing unit to the multiple storage units.

The removable waste storage unit or bin 60 is typically initially contained within the container 10. Generally, an average adult human corpse involves a sufficient amount of waste to require the use of two storage units 60. Of course, it should be appreciated that a single waste storage unit may be used as well as two or more removable waste storage units may be used depending on the particular embalming process and the corpse. The storage unit or bin(s) 60 may include a large rigid bin 160, which may be lined with a bag 170 or other hazardous containment vessel suitable for receiving and storing hazardous waste. The bin(s) may be removed from the container 10 via at least one opening 180 on the container. The bin(s) may have wheels for ease in mobility. The bags may be removed from the bins and stored in manageable hazardous waste containers, which are placed in standard cold storage. Advantageously, the bags are configured to seal and store the mixed waste material and are capable of withstanding below freezing temperatures. Subsequently, the hazardous waste containers may be transported for incineration for disposal once a bulk quantity of waste material has been accumulated.

Figure 2:
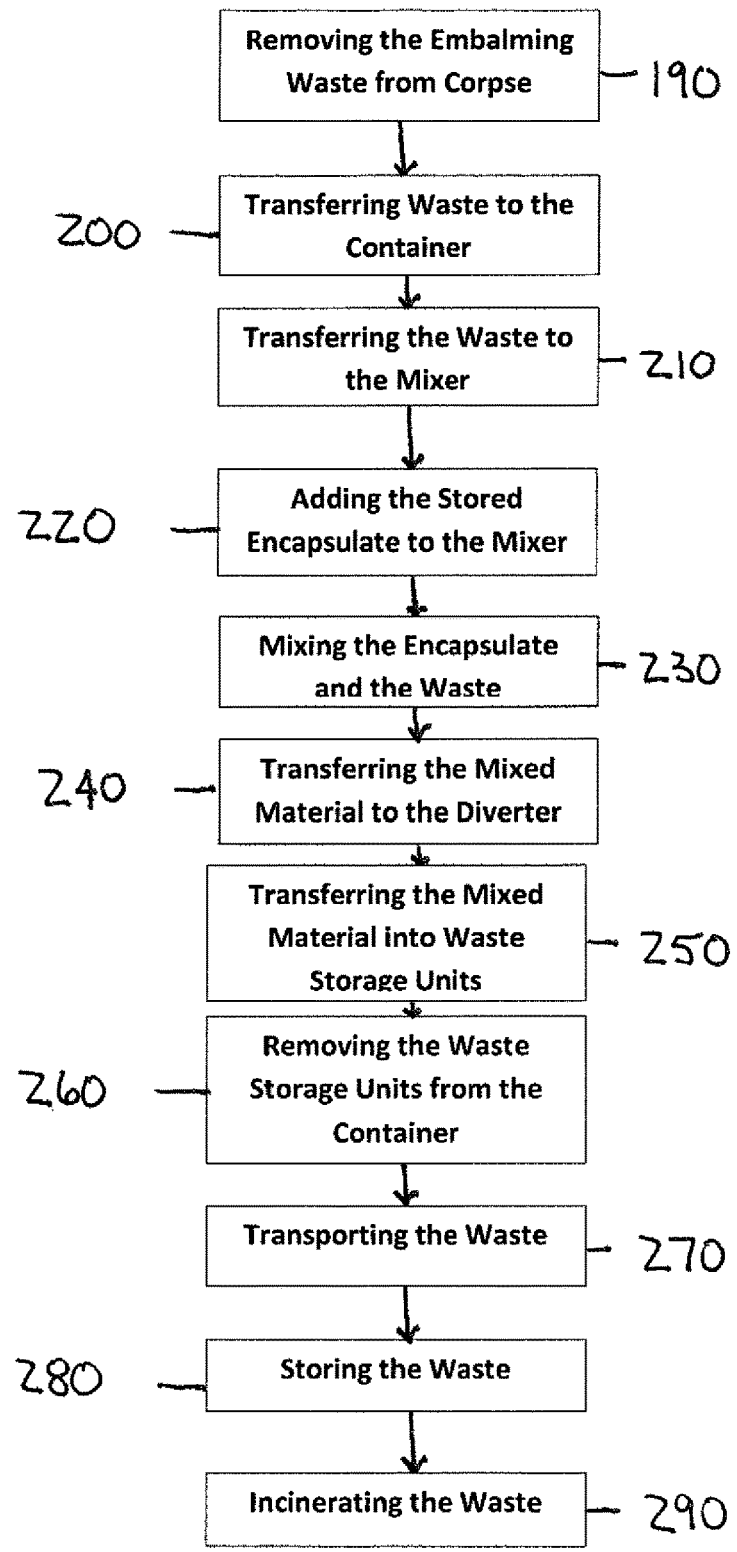
FIG. 2 is a flow chart for the system for storage and disposal of embalming procedure waste resulting from the modern embalming process forming one aspect of this disclosure.

In use and shown in FIG. 2, a user removes 190 the embalming method waste from either an animal or human corpse and transfers 200 the waste to the container 10 via the inlet unit 30. The waste is then transferred 210 from the inlet unit to the mixing unit 40. The encapsulate storage unit 20 then releases 220 stored absorbent encapsulate into the mixing unit 40. The mixing unit 40 activates and mixes 230 the encapsulate and waste for a period of time until the encapsulate and waste form a mixed material. Then the mixing unit 40 transfers 240 the mixed material to the diverter device 50. The diverter device transfers 250 the mixed material to one or multiple removable waste storage units 60 until a predetermined weight value has been reached. The removable waste storage unit(s) is removed 260 from the container and transported 270 for long term storage 280, i.e., typical cold storage and/or disposal via incineration 290.

Advantageously, the above-described device and method for the storage and disposal of embalming procedure waste resulting from the modern embalming process of a human or animal corpse provides for safe storage and disposal of embalming procedure waste and other hazardous wastes from the modern embalming process. Furthermore, device and method for the storage and disposal of embalming procedure waste resulting from the modern embalming process of a human or animal corpse allows the embalming procedure waste to be safely transported for storage and/or disposal. As a result, the device and method for the storage and disposal of embalming procedure waste resulting from the modern embalming process of a human or animal corpse eliminates contamination of the environment and water supplies associated with typical embalming waste disposal, i.e., directly into the sewer system. Furthermore, other materials associated with the embalming process such as mats positioned under the corpse or any paper, towels, etc. may also be easily disposed with the biomedical waste.

The foregoing descriptions of various embodiments are provided for purposes of illustration, and are not intended to be exhaustive or limiting. Modifications or variations are also possible in light of the above teachings. The embodiments described above were chosen to provide the best application to thereby enable one of ordinary skill in the art to utilize the disclosed inventions in various embodiments and with various modifications as are suited to the particular use contemplated. All such modifications and variations are within the scope of the invention.

The invention claimed is:

1. A device for storage and disposal of an embalming procedure waste from an embalming procedure of an animal or human corpse, comprising:
    an inlet receiving the embalming procedure waste;
    an encapsulate storage unit holding an absorbent encapsulate;
    a mixing unit fluidly connected to the inlet and the encapsulate storage unit;
    a diverter device connected to the mixing unit; and
    at least one storage unit configured to receive and store the embalming procedure waste from the diverter device.

2. The device according to claim 1, wherein the inlet is a tube configured for transferring the embalming procedure waste from the animal or human corpse to the mixing unit.

3. The device according to claim 1, wherein the device is mobile.

4. The device according to claim 1, wherein the at least one storage unit includes a first storage unit and a second storage unit.

5. The device according to claim 4, wherein each of the first and second storage units are removable from the device.

6. The device according to claim 1, wherein the mixing unit is tapered towards the diverter device.

7. The device according to claim 1, wherein the encapsulate storage unit is a hopper for dispensing the absorbent encapsulate into the mixing unit.

8. The device according to claim 1, further comprising an outlet.

9. The device according to claim 8, wherein the outlet is a slidable access panel.

10. The device according to claim 8, wherein the outlet is a drawer.

11. A system for storage and disposal of embalming procedure waste from an embalming procedure of an animal or human corpse, comprising:
    a container having an inlet for receiving the embalming procedure waste and an outlet;
    an encapsulate storage unit for holding an absorbent encapsulate;
    a mixer positioned within the container and configured to receive the embalming procedure waste from the inlet and the absorbent encapsulate from the encapsulate storage unit;
    a diverter positioned within the container and below the mixer for receiving a mixed composition of the embalming procedure waste and the absorbent encapsulate, wherein the diverter includes a sensor associated with a valve; and
    at least two removable waste storage units for receiving a predetermined weight of the mixed composition from the diverter, wherein the diverter transfers the mixed composition to a first of the at least two removable storage units until the sensor detects the predetermined weight.

12. The system according to claim 11, wherein the mixer is mechanically driven.

13. The system according to claim 11, wherein the mixer is manually driven.

14. The system according to claim 11, wherein the sensor is configured to automatically shift the valve once the predetermined weight is met such that the diverter transfers a remaining portion of the mixed composition to a second of the at least two removable storage units.

* * * * *